United States Patent [19]

Briggs

[11] Patent Number: 4,555,730

[45] Date of Patent: Nov. 26, 1985

[54] SINGLE CHANNEL SPLIT-SOUND RECEIVER FOR USE WITH TELEVISION SET

[75] Inventor: James B. Briggs, La Canada, Calif.

[73] Assignee: Media Transference International, Los Angeles, Calif.

[21] Appl. No.: 460,450

[22] Filed: Jan. 24, 1983

[51] Int. Cl.[4] .................................................. H04N 5/60
[52] U.S. Cl. .................................... 358/142; 358/143; 358/144; 358/189
[58] Field of Search ............... 358/144, 142, 143, 186, 358/189, 198

[56] References Cited

U.S. PATENT DOCUMENTS

| 4,272,788 | 6/1981 | Ogita | 358/189 |
| 4,302,837 | 11/1981 | Tanaka | 358/144 |
| 4,374,398 | 2/1983 | Yamashita | 358/143 |

OTHER PUBLICATIONS

Television Multichannel Sound Broadcasting-A Proposal, by C. Eilers, IEEE Transactions on Consumer Electronics, vol. CE-27, No. 3, Aug., 1981, pp. 398-408.

Simultaneous Transmission of Two Television Sound Channels, by Y. Numaguchi, NHK Laboratories Note, Serial No. 132, Feb. 1970, pp. 1-29.

Primary Examiner—Tommy P. Chin
Attorney, Agent, or Firm—Keith D. Beecher

[57] ABSTRACT

A simple inexpensive single channel split-sound receiver is provided for use with a conventional television receiver, and which is capable of selectively providing a first language sound and a second language sound for the television programs of a particular television channel received by the television receiver, with the television receiver being used only to reproduce the video portion of the television programs.

2 Claims, 7 Drawing Figures

SINGLE CHANNEL SPLIT-SOUND RECEIVER FOR USE WITH TELEVISION SET

BACKGROUND OF THE INVENTION

As described in an article entitled "Stereophonic Sound For Television" appearing in the I.E.E.E. Spectrum for September 1982, in many parts of Japan and West Germany, the television channels provide stereophonic sound in conjunction with the television programs. In the United States, however, only monophonic sound is provided. However, it is contemplated in the near future that television broadcasters in the United States will begin transmitting stereophonic sound for the audio portion of selected television programs. Several transmission systems for stereophonic television sound have been proposed, including a proposal from the Zenith Radio Corporation of Glenview, Ill. and several others.

A feature of the proposed stereophonic system is that the stereophonic sound signals can be received and reproduced monophonically on existing television receivers. In the future, however, it is contemplated that television receivers will be marketed with the necessary dual channels and speakers for self-contained stereophonic reproduction.

The Zenith stereophonic system is described, for example, in U.S. Pat. No. 4,339,772 which issued July 13, 1982, and which is assigned to Zenith. As described in that patent, under present television broadcasting standards, a band of frequencies approximately 80 KHz wide is designated within each 6 MHz television channel for the transmission of the audio component of the television signal.

Within this band of frequencies, a radio frequency main audio carrier is frequency modulated by an audio base band signal for producing a monaural transmission signal. The transmitted monaural audio signal may be received by a television receiver which converts the radio frequency audio carrier signal into a signal having a frequency centered at 4.5 MHz. The converted 4.5 MHz sound carrier is then processed by a frequency modulation detector to reproduce the monaural audio signal. In this regard, it has been recognized that the audio bandwidth of present-day television channels is presently being under utilized, thus affording the opportunity for the transmission of a substantial amount of audio information in addition to the conventional monaural signal.

As also pointed out in U.S. Pat. No. 4,339,772, in addition to transmitting stereophonic sound components on the main aural carrier of a transmitted television signal, it is also desirable to transmit additional information so as to utilize more completely the available audio bandwidth within the television channel. For example, the transmission of a second language audio signal would enable a viewer selectively to operate a television receiver for reproducing the audio signals associated with the transmitted stereophonic information or, alternatively, reproduce the audio signals associated with the transmitted second language information. Other examples of such additional information include electronic news gathering (ENG) signals and telemetry signals, which may be utilized by television broadcasters for their own private use.

An objective of the present invention is to provide a simple and inexpensive split-sound receiver for use in such a system, in conjunction with a conventional television receiver, whereby the picture content of a transmitted television signal may be reproduced by the conventional television receiver, with the sound muted, and whereby first and second language audio signals may be selectively reproduced by the receiver of the invention. The receiver of the invention includes a self-contained antenna for receiving radio frequency signals from the television receiver, and a radio frequency channel for passing signals corresponding only to a single channel of the television receiver so as to maintain the simplicity of the receiver, and to reduce its cost to an absolute minimum.

DETAILED DESCRIPTION OF THE PRIOR ART AND OF THE PREFERRED EMBODIMENT OF THE INVENTION

Figure 1:
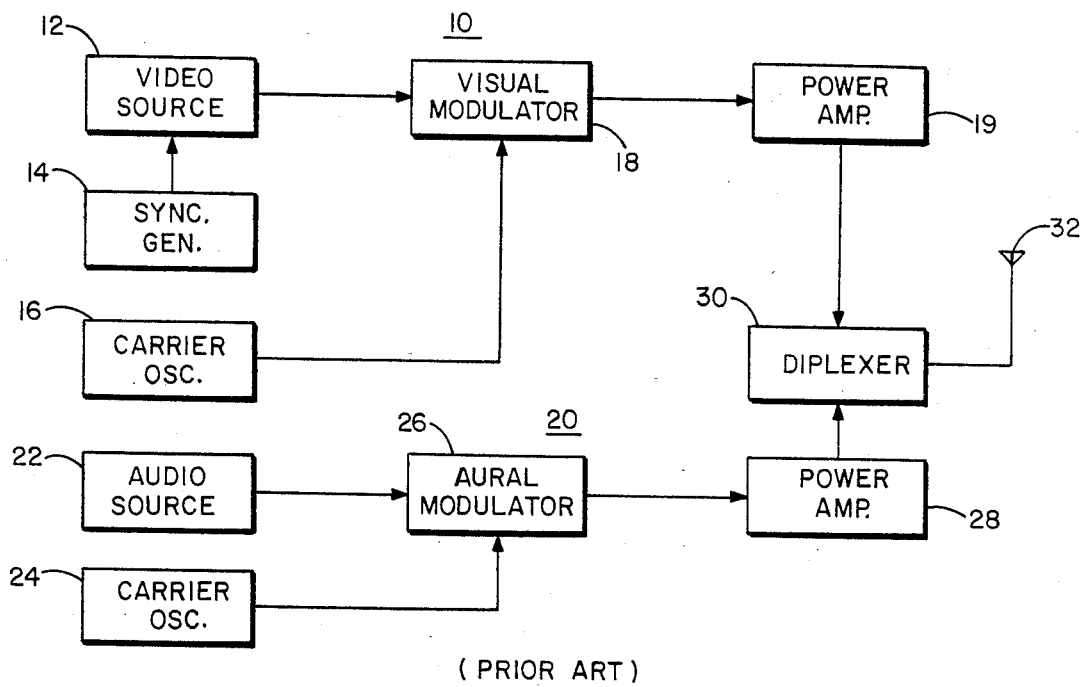
FIG. 1 is a functional block diagram of a television signal transmitter including apparatus for transmitting both the video and audio components of a television signal, such as described in U.S. Pat. No. 4,339,772.

Referring now to the drawings, and in particular to FIG. 1, a conventional television signal transmitter such as disclosed in U.S. Pat. No. 4,339,772 is shown. The transmitter comprises a video channel 10 and an audio channel 20. The video channel 10 includes a source of video signals 12, a synchronizing signal generator 14 connected to the video source, and a radio frequency carrier oscillator 16. The oscillator 16 and the video source 12 supplies signals to a video modulator 18 which, in turn, develops an output signal comprising a continuous sequence of horizontal scanning lines defined by the synchronizing signal generator 14, with each horizontal scanning line consisting of the radio frequency carrier developed at the output of the carrier oscillator 16 amplitude modulated by the output of the video source 12.

According to standards of the Federal Communication Commission, the horizontal scanning line frequency $f_H$ is approximately 15.75 KHz. The output of the video modulator 18 is amplified by a power amplifier 19 and coupled through a conventional diplexer 30 transmitted by way of an antenna 32.

The aural channel 20 of the transmitter of FIG. 1 conventionally includes a source of monaural audio signals 22 and a radio frequency carrier oscillator 24, both supplying an audio modulator 26. The output of the audio modulator 26, which consists of the radio frequency carrier developed at the output of oscillator 24 frequency modulated by the output of audio source 22, is amplified by a power amplifier 28 and coupled therefrom through diplexer 30 for transmission by way of antenna 32. As explained in the patent, the particular four sub-carriers selected for use by the transmitter of FIG. 1 allow for the most efficient use of the audio bandwidth associated with the transmitted television signal.

Figure 2:
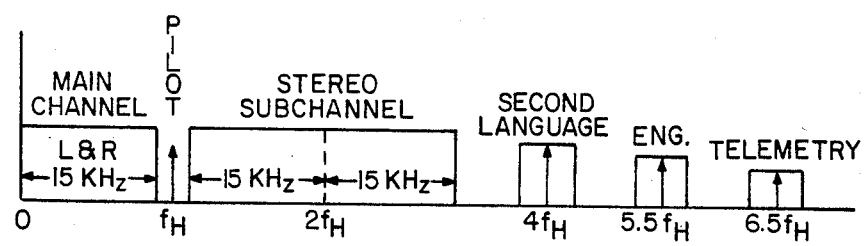
FIG. 2 is a graphic representation of the frequency spectrum of the composite base band signal developed within the transmitter of FIG. 1.

In particular, and as shown in FIG. 2, it will be observed that, considering the 15 KHz bandwidth of the main channel (L+R) signal, and the 15 KHz bandwidth of the lower side bands of the stereo subchannel signal, the lowest harmonic of the horizontal scanning line frequency $f_H$ available for use as the stereo sub-channel sub-carrier is $2 f_H$. It is desirable to use a harmonic of the horizontal scanning line frequency $f_H$ for this sub-carrier in order to prevent the production of audible intermodulation beats therebetween. Similarly, it is also desirable to use a harmonic of the horizontal scanning line frequency $f_H$ as the sub-carrier for the second language audio signal.

Considering the 15 KHz bandwidth of the upper side bands of the stereo sub-channel signal and the approximately 12 KHz bandwidth of the second language signal, the next harmonic of the horizontal scanning line frequency $f_H$ available for use as the second language sub-carrier signal is $4 f_H$. Allowing for sufficient separation between the upper side bands of the frequency modulation second language signal and the lower side bands of the frequency modulated ENG signal, the next available harmonic of the horizontal scanning line frequency $f_H$ is $6 f_H$.

However, since $6 f_H$ is an odd harmonic of the stereo sub-channel sub-carrier $2 f_H$, its use as a sub-carrier is not desirable. Consequently, sub-carriers for the ENG and telemetry signals are spaced about $0.5 f_H$ therefrom at approximately $5.5 f_H$ and $6.5 f_H$. The main carrier deviations and associated filter band path characteristics for these signals are so chosen to prevent interference with adjacent channels. Any resulting beating of the sub-carriers with the horizontal scanning line frequency is expected to be minimal.

Figure 3:
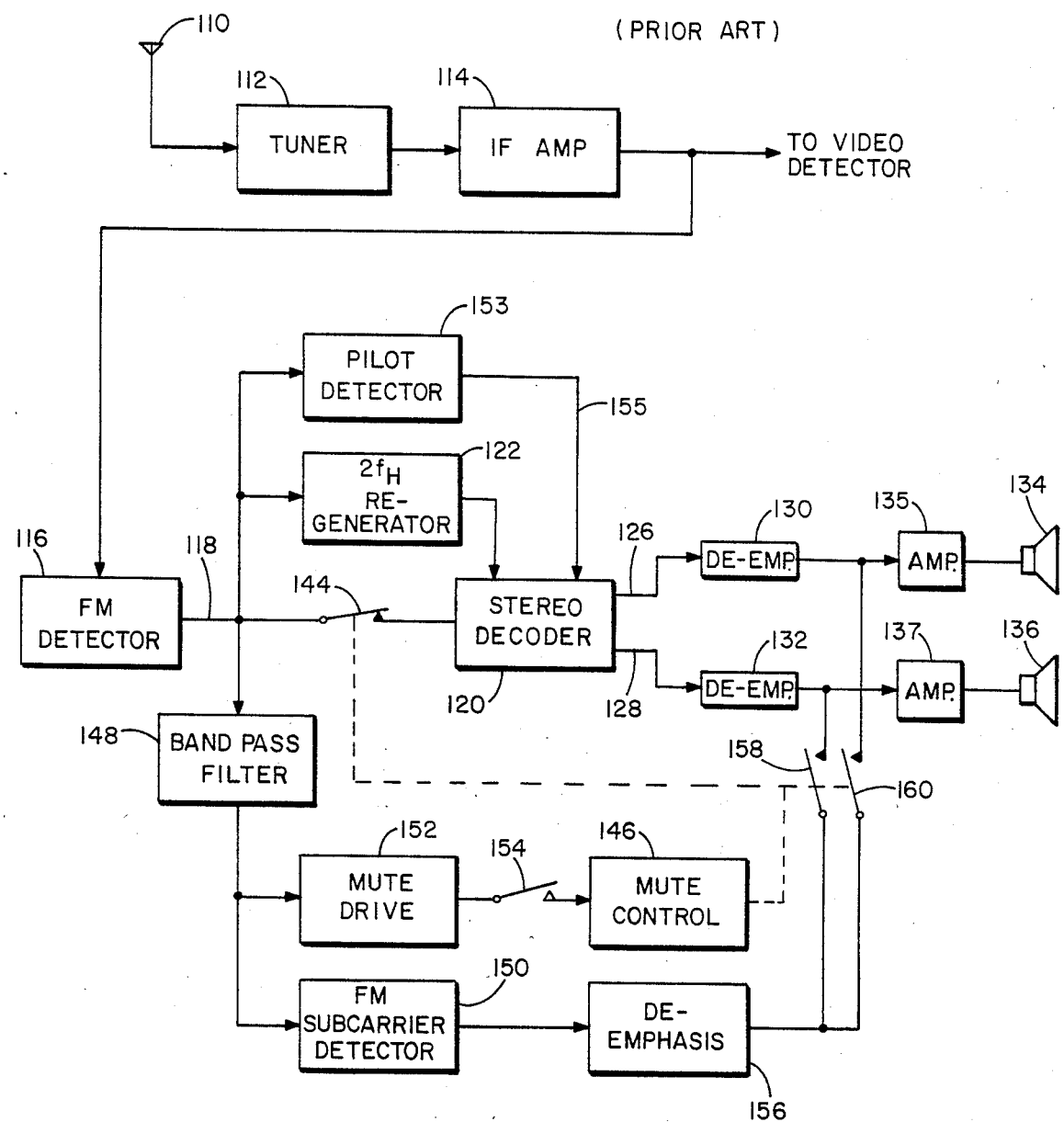
FIG. 3 is a functional block diagram of a television receiver described in the patent which is adapted for selectively reproducing either a first language stereophonic sound or a second language sound in response to a television signal received from the transmitter of FIG. 1.

FIG. 3 illustrates a television receiver described in U.S. Pat. No. 4,339,772 for reproducing the stereophonic sound transmissions characterizing the frequency modulated main aural radio frequency carrier developed at the output of transmitting antenna 32 of FIG. 1.

The receiver of FIG. 3 includes an antenna 110 for intercepting the transmitted radio frequency signals, including both visual and aural components, which signals are coupled to a conventional television tuner 112. The tuner 112 converts the received radio frequency signals into corresponding intermediate frequency (IF) signals which are amplified by an intermediate frequency amplifier 114. The visual components of the amplified intermediate frequency signal are coupled to a video detector and therefrom to the remaining video processing circuits of the television receiver, while the inter-carrier components of the amplified intermediate frequency signal are applied to a conventional frequency modulation detector 116.

The frequency modulation detector 116 functions in a manner well known to the art to demodulate the inter-carrier signal so as to recreate the composite baseband signal on output conductor 118. The composite baseband signal developed on conductor 118 is applied to one input of a conventional stereo decoder network 120. The decoder network receives a second input from a sub-carrier regenerator network 122. The $f_H$ pilot signal developed on conductor 118 is coupled to an input of the regenerator network 122 which develops an output in response thereto comprising a regenerated 2 $f_H$ sub-carrier signal phase locked to the pilot signal.

The stereophonic decoder network 120 is responsive to the regenerated 2 $f_H$ sub-carrier signal and to the main channel and stereo sub-channel signals for developing emphasized representations of the Left (L) and Right (R) stereophonically related audio signals on a pair of output conductors 126 and 128 respectively. These signals are de-emphasized by de-emphasis circuits 130 and 132 to form accurate reproductions on the Left (L) and Right (R) stereophonically related audio signals which are coupled to separate speaker systems 134 and 136 through amplifiers 135 and 137 for conversions to corresponding audio signals.

With the circuit of FIG. 3, the viewer of a television receiver may select either the transmitted stereophonic signals or, alternatively, the second language audio signals for reproduction. The line 118 includes a switch 144 which is ganged for operation with a pair of switches 158 and 160 in response to the output from a mute control circuit 146. The circuit of FIG. 3 further includes a bandpass filter 148 passing the second language component of the composite baseband signal to a frequency modulation sub-carrier detector 150. The output of bandpass filter 148 is coupled to a mute drive circuit 152 which detects the presence of a frequency modulation sub-carrier signal. The output of the mute drive circuit 152 is connected to a mute control circuit 146 by a viewer operable selector switch 154. The output of the frequency modulation detector 150 is coupled by a de-emphasis circuit 156 to the inputs of switches 158 and 160 whose outputs are connected to the speakers 136 and 134 respectively.

In operation, when the viewer selector switch 154 is in the position shown in FIG. 3, no drive signal can be supplied to the mute circuit 146, and switches 144, 158 and 160 assume the illustrated positions. In this condition of the circuit, the stereo decoder 120 is operative for energizing speakers 134 and 136 through the de-emphasis circuits 130 and 132 for reproducing the stereophonic sound.

However, when the viewer selector switch 154 is moved to its closed position, drive circuit 152, in response to the presence of a second language sub-carrier signal, energizes mute circuit 146 which causes switch 144 to open and switches 158 and 160 to close. The stereo decoder 120 is thereby decoupled from the frequency modulation detector 116 and, at the same time, signals are applied from the frequency modulation detector 116 through the bandpass filter 148 and the frequency modulation sub-carrier detector 150 to the speakers 134 and 136 Since the frequency modulation sub-carrier detector 150 demodulates the frequency modulated 4 $f_H$ second language sub-carrier, speakers 134 and 136 will reproduce the second language audio signal.

The $f_H$ pilot signal is also coupled from line 118 to the input of a pilot detector 153. When the pilot detector detects the presence of an input $f_H$ pilot signal it develops a signal on the output control line 155 conditioning the stereo decoder 120 for the suitable demodulation of the stereo signals.

The split-sound receiver of the present invention is a simplified version of the complex receiver of FIG. 3. The receiver of the invention is constructed for use with a single channel of a conventional television receiver, and it does not include its own tuner or other television components, as is the case with the receiver of FIG. 3. Instead, the simple receiver of the present invention includes a self-contained antenna which responds to the radio frequency signal emitted by the adjacent television receiver, when the receiver is tuned to a particular television channel, and a radio frequency amplifier which is constructed to accept only that particular channel. A block diagram of one embodiment of the receiver of the invention is shown in FIG. 4.

Figure 4:
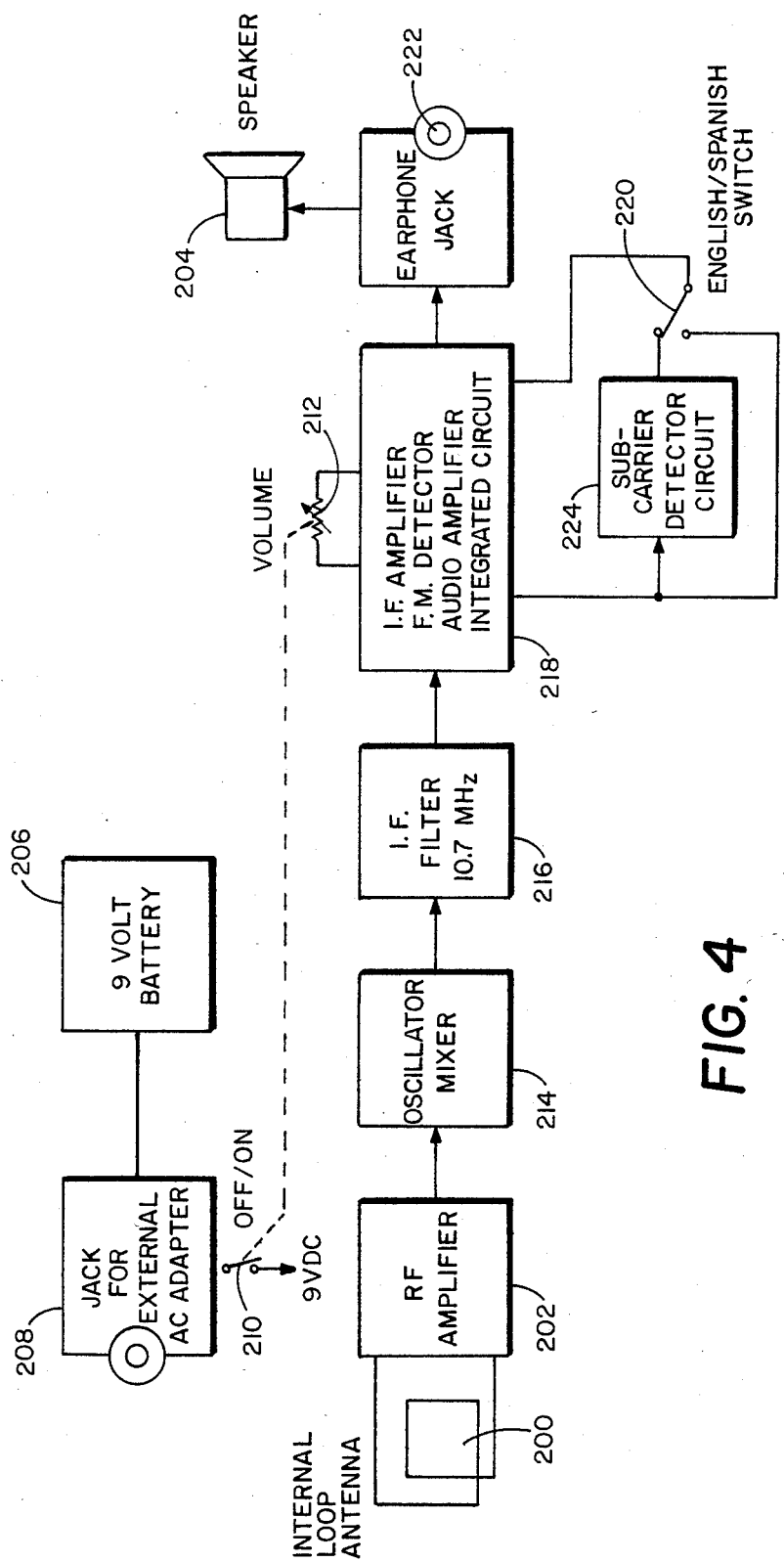
FIG. 4 is a block diagram of a simplified receiver representing one embodiment of the invention.

The receiver shown in FIG. 4 includes an internal loop antenna 200 which is connected to a radio frequency amplifier 202. As mentioned above, the loop antenna 200 receives the television signal emitted by the radio frequency circuitry of the television receiver when the receiver is tuned to a particular television channel. As also explained, in the practice of the invention, the normal sound-reproducing circuitry of the television receiver is manually muted, by the operator and the sound accompanying the television programs received on the particular channel are reproduced by the receiver of FIG. 4 in speaker 204.

The receiver of FIG. 4 is powered, for example, by a 9 volt battery 206, which may, if so desired, be used in conjunction with an alternating current adapter 208 which produces the 9 volt direct current required by the receiver when connected to an external alternating current source. The receiver is energized by a power switch 210 which may be mechanically coupled to a volume control potentiometer 212.

The radio frequency amplifier 202 is connected to an oscillator mixer 214 which functions as a first detector, and which converts the radio frequency output signal from amplifier 202 into an intermediate frequency signal of, for example, 10.7 MHz. The intermediate frequency signal from mixer 214 is filtered by a bandpass filter 216, and the output of filter 216 is introduced to a block 218 which includes an intermediate frequency amplifier, a frequency modulation second detector, and an audio amplifier. The audio output of block 218, for one position of switch 220, is applied to the speaker 204, and this output constitutes the first language sound which accompanies the video program of a particular channel reproduced by the adjacent television receiver. An earphone jack 222 is provided, so that earphones may be used in place of speaker 204.

When switch 220 is placed in the position shown in FIG. 4, the output of a sub-carrier detector circuit 224 is applied to speaker 204, so that the second language sound, rather than the first language sound is reproduced by speaker 204, or by the earphones inserted into jack 222.

Figure 5A:
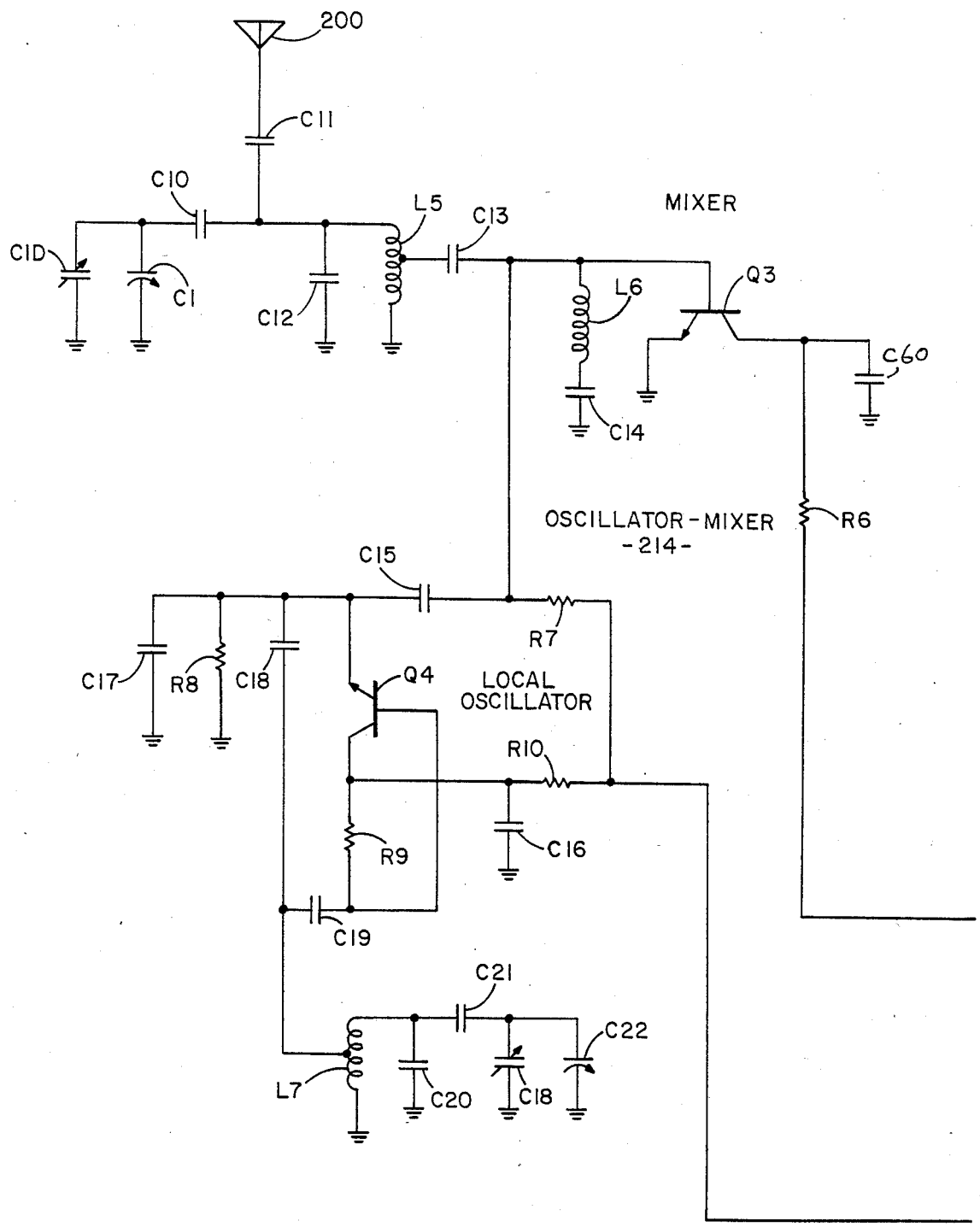
FIG. 5A and 5B are more detailed circuit diagram of the receiver of FIG. 4.
Figure 5B:
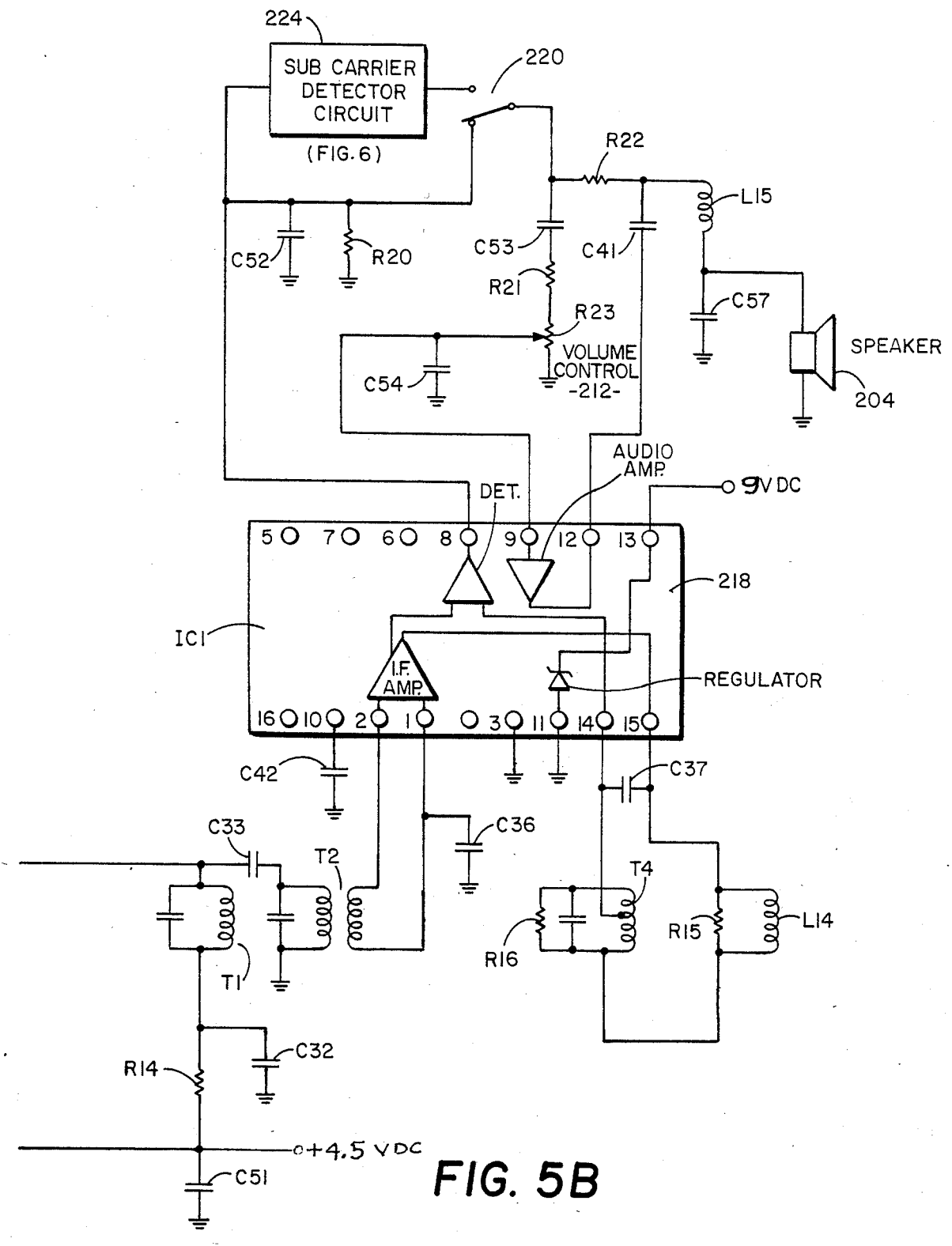
Figure 6:
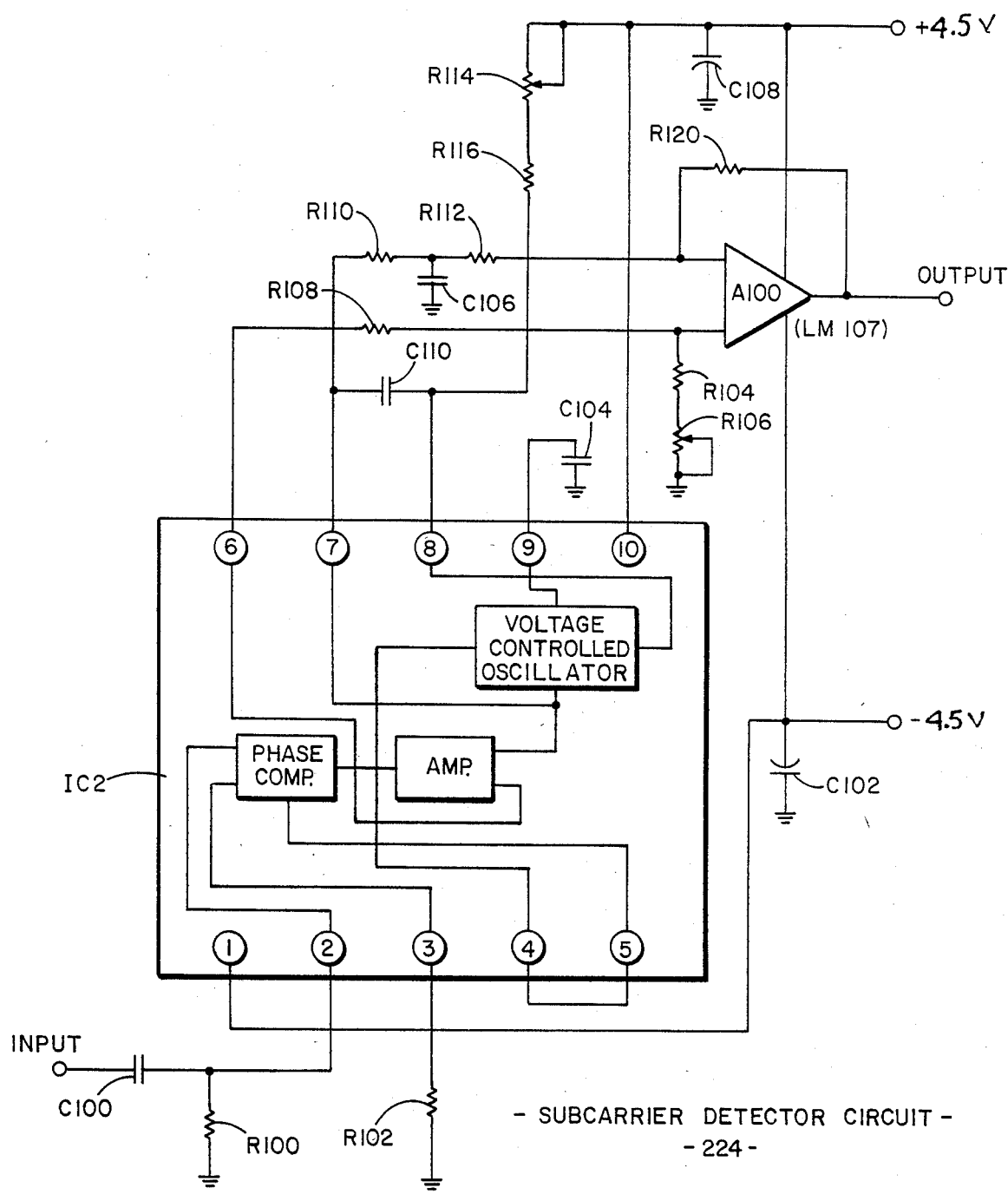
FIG. 6 is a detailed circuit diagram of a subcarrier detector circuit included in the receiver.

The circuit details for the receiver of FIG. 4 are shown in FIGS. 5A, 5B and 6.

The particular circuit of FIG. 5A does not, in fact, include a radio frequency amplifier, instead, antenna 200 is coupled to a band-pass filter circuit comprising a capacitor C11, a capacitor C10, a capacitor C12, and an inductance coil L5. The circuit is fine tuned precisely to a particular television channel by capacitors C1D and C1.

The inductance coil L5 is coupled through a coupling capacitor C13 to the base of an NPN transistor Q3 which functions as the mixer portion of the oscillator mixer Q14. The base of transistor Q3 is connected to an inductance coil L6 which, in turn, is connected to a grounded capacitor C14.

The oscillator portion of the oscillator mixer 214 is provided by the circuit of an NPN transistor Q4. The emitter of transistor Q4 is connected to a grounded resistor R8, and to a grounded capacitor C17. The emitter is also coupled through a capacitor C15 to the base of transistor Q3, and through a capacitor C18 to a tap on an inductance coil L7. The tap is also connected to a capacitor C19 which, in turn, is connected to the base of transistor Q4 and through a resistor R9 to its collector. Inductance coil L7, together with a capacitor C20 and a capacitor C21 establishes the frequency of the oscillator, as set by fine tuning capacitors C1B and C1.

A 10.7 MHz intermediate frequency signal is produced at the collector of transistor Q3 which is connected to a grounded capacitor C60, and through a resistor R6 to an intermediate frequency transformer designated T1, T2 in FIG. 5B.

The intermediate frequency transformer T1, T2 is tuned to the intermediate frequency of 10.7 MHz, and the secondary of the transformer T2 is coupled across pins 1 and 2 of an integrated circuit designated IC1, which may be of the type designated GE EA33X8537. As illustrated, these pins are connected to an intermediate frequency amplifier contained within the integrated circuit, the output of which is connected to one input of a frequency modulation discriminator or detector which is also included within the integrated circuit.

The output of the intermediate frequency within the integrated circuit is also connected to pin 15, and passes through a further circuit, including intermediate frequency transformer T4 and inductance coil L14, by way of pins 15 and 14, to constitute the second input for the detector, the second input shifting in phase in response to the frequency modulation of the intermediate frequency, so that an audio signal may be produced at the output of the detector, at pin 8 of the integrated circuit IC1.

The output of detector is applied to the sub-carrier detector circuit 224, and to the lower fixed contact of switch 220, the upper fixed contact being connected to the output of the sub-carrier detector circuit. When the switch is in the illustrated position, the audio output from the detector of the integrated circuit is applied to the speaker which is caused to reproduce the first language sound. However, when switch 220 is moved to its second position, the output of the sub-carrier detector circuit 224 is applied to the speaker, which output constitutes the second language sound. In either case, the volume may be controlled by potentiometer R23 which forms the volume control 212.

The circuit details of the sub-carrier detector circuit 224 are shown in FIG. 6. In FIG. 6, the input to the sub-carrier detector circuit derived from pin 8 of integrated circuit IC1 (218) of FIG. 5B is coupled through a capacitor C100 to pin 2 of an integrated circuit IC2 which may be of the type designated LM565. Capacitor C100 is also connected to a grounded resistor R100. Pin 3 of integrated circuit IC2 is connected to a grounded resistor R102, and pins 2 and 3 are connected to a phase comparator which is included within the integrated circuit.

The phase comparator is also connected to an amplifier within the integrated circuit which, in turn, is connected to a voltage controlled oscillator within the integrated circuit. The voltage controlled oscillator is connected to pins 7, 8 and 9, as shown. A capacitor C110 is bridged across pins 7 and 8, and pin 9 is connected to a grounded capacitor C104. Pins 6 and 7 are connected to an amplifier A101, pin 7 being connected through resistors R110 and R112, and pin 6 being connected through a resistor R108. The junction of resistors R110 and R112 is connected to a grounded capacitor C106. The output of amplifier A100 is applied to the upper fixed contact of switch 220, as shown in FIG. 5B.

The circuit of FIG. 6 responds to the sub-carrier contained within the output from the detector within the integrated circuit IC1 (218). This sub-carrier is modulated with the second language sound, and the circuit of FIG. 6 demodulates the second language sound to produce the second language audio signals at its output.

When switch 220 is moved to the upper fixed contact in FIG. 5B, speaker 204 reproduces the second language sound, and when the switch is set to its lower fixed contact, shown in FIG. 5B, the speaker 204 reproduces the first language sound.

The invention provides, therefore, an extremely simple receiver, which includes its own internal antenna, so that it may pick up the radio frequency signal from an adjacent television receiver, or from a broadcast transmitter, when the receiver is tuned to a particular channel, and which serves to reproduce the sound accompanying the television program for that particular channel in either of two languages.

It will be appreciated that while a particular embodiment of the invention has been shown and described, modifications may be made. It is intended in the claims to cover all modifications which come within the spirit and scope of the invention.

What is claimed is:

1. A split-sound receiver for reproducing foreign language audio signals accompanying a television signal received on a particular channel of a television receiver, said television receiver radiating a radio frequency signal when the television receiver is tuned to television channel, said television signal including a first sub-carrier modulated in accordance with audio signals representative of a first language and a second sub-carrier modulated in accordance with audio signals representative of a second language, said receiver comprising: an antenna for receiving the radio frequency signal from the television receiver when the television receiver is tuned to a particular television channel; band-pass circuit means coupled to said antenna and tuned to said particular television channel to pass only the radio frequency signal associated with said particular television channel; first detector means coupled to the band-pass circuit means for converting the radio frequency signal passed by said band-pass circuit means into an intermediate frequency signal of a selected intermediate frequency; circuit means coupled to said first detector means and including a sub-carrier detector circuit responsive to said intermediate frequency signal from said first detector means for detecting said second sub-carrier to recover the second language audio signals; a speaker; and output circuit means connecting the output of said sub-carrier detector circuit to said speaker to apply said second language audio signals thereto.

2. The receiver defined in claim 1, in which said circuit means includes further sub-carrier detector means for detecting said first sub-carrier to recover the first language audio signals; and switching means includes in said output circuit means for selectively connecting the speaker to the output of the first-mentioned sub-carrier detector circuit and to the output of said further sub-carrier detector means.

* * * * *